(12) United States Patent
Haartsen et al.

(10) Patent No.: US 7,973,711 B2
(45) Date of Patent: Jul. 5, 2011

(54) CONTROLLING SATELLITE NAVIGATION RECEIVERS IN RESPONSE TO LOW FREQUENCY ELECTROMAGNETIC SIGNALS

(75) Inventors: Jacobus Cornelis Haartsen, Hardenberg (NL); Frank Hooijschuur, Emmen (NL); William O. Camp, Jr., Chapel Hill, NC (US); Charles Liu, Chapel Hill, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 425 days.

(21) Appl. No.: 12/130,172

(22) Filed: May 30, 2008

(65) Prior Publication Data

US 2009/0295629 A1 Dec. 3, 2009

(51) Int. Cl.
*G01S 19/34* (2010.01)
(52) U.S. Cl. .................................. 342/357.74
(58) Field of Classification Search ............. 342/357.74; 455/574; G01S 19/34
See application file for complete search history.

(56) References Cited

U.S. PATENT DOCUMENTS

| | | | |
|---|---|---|---|
| 6,236,354 B1 * | 5/2001 | Krasner | 342/357.59 |
| 6,438,381 B1 | 8/2002 | Alberth, Jr. et al. | |
| 7,289,626 B2 * | 10/2007 | Carter et al. | 379/387.02 |
| 2005/0119895 A1 * | 6/2005 | Odinak | 704/270.1 |
| 2005/0237347 A1 | 10/2005 | Yamaji et al. | |
| 2007/0239813 A1 * | 10/2007 | Pinder et al. | 708/270 |

OTHER PUBLICATIONS

International Search Report and Written Opinion (13 pages) corresponding to International Patent Application No. PCT/US2008/013270; Mailing Date: Jul. 14, 2009.
International Preliminary Report on Patentability for PCT/US2008/013270 dated Nov. 30, 2010.

* cited by examiner

*Primary Examiner* — Thomas H Tarcza
*Assistant Examiner* — John B Vigushin
(74) *Attorney, Agent, or Firm* — Myers Bigel Sibley & Sajovec

(57) ABSTRACT

Methods of operating a satellite navigation system (SNS) receiver in a portable electronic device according to some embodiments include determining the presence or absence of a low frequency signal associated with power distribution lines, and disabling the SNS receiver in response to detecting the low frequency signal associated with power distribution lines. The methods may further include detecting weakening of a satellite navigation signal, and determining the presence or absence of a low frequency signal associated with power distribution lines may be performed in response to a detected weakening of the satellite navigation signal. Related devices are also disclosed.

18 Claims, 4 Drawing Sheets

CONTROLLING SATELLITE NAVIGATION RECEIVERS IN RESPONSE TO LOW FREQUENCY ELECTROMAGNETIC SIGNALS

BACKGROUND

1. Field of the Invention

The present invention relates to satellite navigation systems, such as the Global Positioning System (GPS), and, in particular, to satellite navigation receivers and associated methods of controlling satellite navigation receivers.

2. Description of the Related Art

Satellite navigation systems have been available to the public for many years. In particular, the Global Positioning System (GPS), which was developed by the U.S. Department of Defense, was made available for public use in 1983. Other satellite navigation systems are currently in development, including the GLONASS system (Russia), the Galileo positioning system (Europe), the COMPASS navigation system (China), and IRNSS (India).

The GPS system includes 24 Medium Earth Orbit (MEO) satellites that transmit precise timing signals to terrestrial receivers. Unlike geostationary orbiting satellites, MEO satellites move across the sky relative to the position of a terrestrial receiver. Thus, a given MEO satellite may be visible, or not visible, to a terrestrial receiver at any moment. However, the MEO satellites are arranged in six orbital planes with four satellites each, so that a number of the satellites are visible from any point on earth at any moment. By examining the signals received from a plurality of the satellites, a GPS receiver can determine its position.

A GPS receiver can calculate its position using the GPS signals from four or more GPS satellites. The signals from the four satellites are used to solve for four variables: x-, y-, z-position, and time. The GPS receiver can then convert these values into latitude/longitude information, and can typically display the location of the receiver on a map.

The GPS signal includes a Navigation Message that provides the time-of-day, GPS week number and satellite health information. The Navigation Message also includes ephemeris data and an almanac. The ephemeris data provides detailed information about the orbit of the satellite that transmitted the navigation message. The almanac provides coarse orbit and status information for each satellite in the constellation, an ionospheric model, and information to relate GPS derived time to Coordinated Universal Time (UTC).

The Navigation Messages are sent in frames at 50 bits/second, each taking 30 seconds to transmit 1500 bits. The time needed to acquire the ephemeris is significant, as the ephemeris data requires at least 30 seconds to be received completely.

Because satellite signals are relatively weak, they cannot readily penetrate into buildings, shelters, tunnels, or other covered locations. When a GPS receiver is taken into such a location, all of the GPS signals then being processed by the GPS receiver can become so heavily attenuated that they are lost entirely. The GPS receiver may then begin a process of signal acquisition in an attempt to locate a sufficient number of GPS signals to allow the receiver to determine its geographic location. Given the amount of time required to search for the GPS signals, and the number of signals that a GPS receiver must search for, a GPS receiver can consume significant amounts of power when all of the GPS signals are lost.

SUMMARY

Methods of operating a satellite navigation system (SNS) receiver in a portable electronic device according to some embodiments include determining the presence or absence of a low frequency signal associated with power distribution lines, and disabling the SNS receiver in response to detecting the low frequency signal associated with power distribution lines.

The methods may further include detecting weakening of a satellite navigation signal, and determining the presence or absence of a low frequency signal associated with power distribution lines may be performed in response to a detected weakening of the satellite navigation signal.

The portable electronic device may include a microphone circuit configured to generate an electrical signal in response to environmental sounds and/or in response to environmental electromagnetic fields, and determining the presence or absence of a low frequency electromagnetic field associated with power distribution lines, due to the conversion of this electromagnetic field to a low frequency electrical signal across the high impedance microphone circuit, may include analyzing the audio signal received over the microphone. The low frequency signal may have a frequency of less than about 100 Hz. For example, the low frequency signal may have a frequency in the range of about 50 Hz to about 60 Hz.

The portable electronic device may further include a digital signal processor coupled to the microphone circuit and configured to receive the audio signal, and analyzing the audio signal may include analyzing the audio signal using fast fourier transform processing in the digital signal processor.

Disabling the SNS receiver may include at least one of (a) turning the SNS receiver off, (b) configuring the SNS receiver to cease searching for satellite navigation signals, and (c) decreasing a timeout value in the SNS receiver associated with searching for satellite navigation signals.

The methods may further include detecting a reduction of the low frequency signal associated with power distribution lines after disabling the SNS receiver, and enabling the SNS receiver in response to detecting the reduction of the low frequency signal associated with power distribution lines.

Detecting a reduction of the low frequency signal associated with power distribution lines may include detecting an absence of the low frequency signal associated with power distribution lines.

The satellite navigation signal may include a plurality of satellite navigation signals from a plurality of SNS satellites, and weakening of the satellite navigation signal may include weakening of the plurality of satellite navigation signals.

The portable electronic device may further include a short-range wireless transceiver, and the methods may further include activating the short-range wireless transceiver in response to detecting weakening of the satellite navigation signal and detecting the presence of the low frequency signal, and establishing a short-range wireless communication channel using the short-range wireless transceiver.

The methods may further include detecting a loss of signal associated with the short-range wireless communication channel, and enabling the SNS receiver in response to the loss of signal associated with the short-range wireless communication channel.

The methods may further include receiving position information regarding a current position of the portable electronic device over the short-range wireless communication channel, and providing the position information obtained over the short-range wireless communication channel to the SNS receiver.

BRIEF DESCRIPTION OF THE DRAWINGS

The accompanying drawings, which are included to provide a further understanding of the invention and are incor

DETAILED DESCRIPTION

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Figure 1:
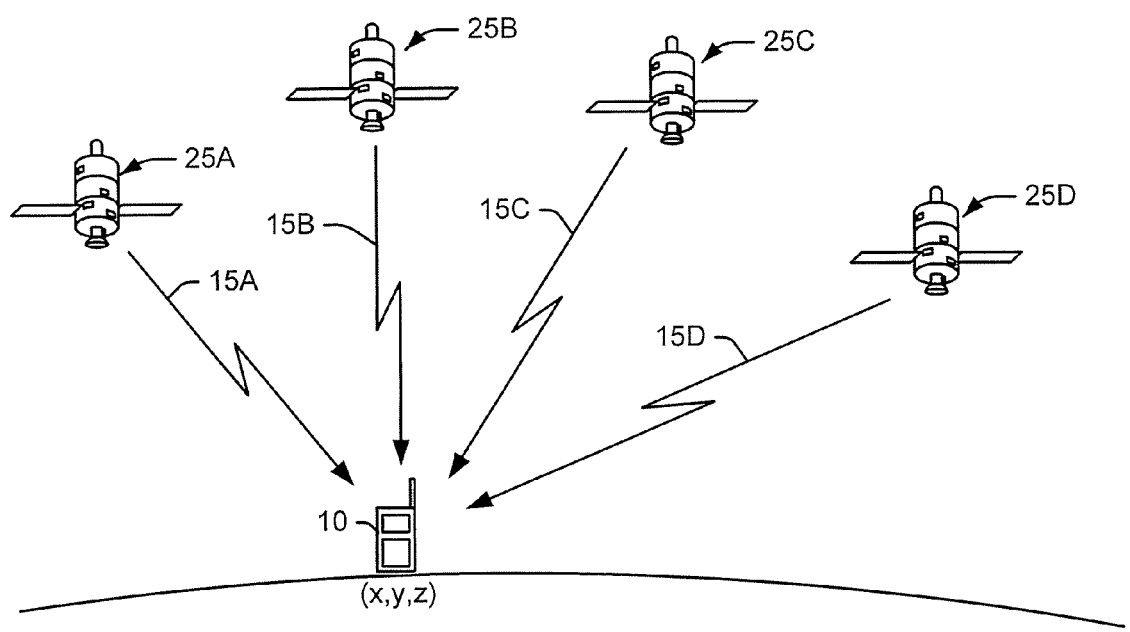
- FIG. 1 illustrates a system including a satellite navigation system (SNS) unit and four navigation satellites.

FIG. 1 illustrates a system including a satellite navigation system (SNS) receiver 10 and four navigation satellites 25A-25D. In some embodiments, the SNS may include the Global Positioning System (GPS). However, it will be appreciated that embodiments of the invention may be applicable to, and employed with, satellite navigation receivers designed for other types of satellite navigation systems. The SNS unit 10 receives satellite navigation signals 15A-15D from the navigation satellites 25A-25D, and uses information transmitted in the satellite navigation signals 15A-15D to calculate its geographic position (x,y,z).

Figure 2:
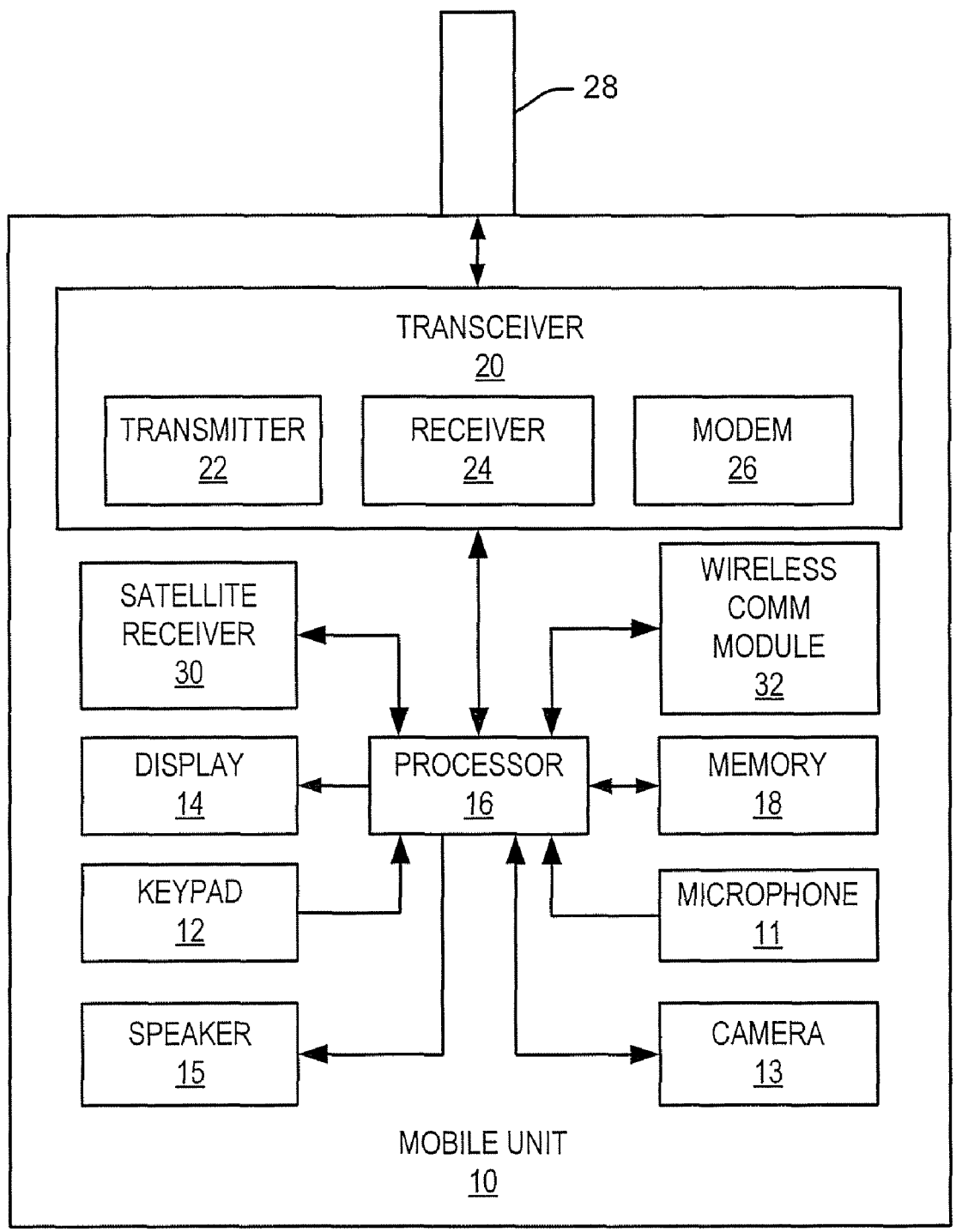
FIG. 2 is a block diagram of an SNS unit according to some embodiments.

FIG. 2 is a block diagram of an SNS unit 10 according to some embodiments. In the embodiments illustrated in FIG. 2, the SNS unit 10 is implemented in a wireless communication terminal, such as a mobile telephone, that is capable of bidirectional wireless communication. As show in FIG. 2, an exemplary SNS unit 10 includes a processor 16 that controls operations of the receiver 10. The SNS unit 10 further includes a keypad 12, a display 14, a cellular transceiver 20 and a memory 18 that communicate with the processor 16. The cellular transceiver 20 is coupled to an antenna 28 that is tuned to transmit/receive electromagnetic signals in a cellular communications band.

The SNS unit 10 includes a SNS receiver 30 that receives and processes satellite navigation signals. The satellite navigation unit may include a dedicated antenna (not shown) that is tuned to receive satellite downlink signals in a satellite communication band, such as the L-band, which is used for GPS signals.

The SNS unit 10 can also include a wireless communication module 32 for short-range wireless data communications (e.g. less than about 100 meters using an omni-directional antenna). The wireless communication module 32 can support communications using a wireless LAN standard, such as IEEE 802.11b or 802.11g and/or a peer-to-peer wireless networking protocol, such as Bluetooth or IEEE 802.15.4. The wireless communication module 32 may include a dedicated antenna (not shown) that is tuned to transmit/receive wireless communication signals at an appropriate frequency.

The SNS unit 10 can optionally include a microphone 11, a speaker 15 and a camera 13. It will be appreciated that the SNS unit 10 can include other features and/or functionality, and that the features described above are included herein for exemplary purposes.

The transceiver 20 typically includes a transmitter circuit 22, a receiver circuit 24, and a modem 26, which cooperate to transmit and receive radio frequency signals to remote transceivers via an antenna 28. The radio frequency signals transmitted between the SNS unit 10 and the remote transceivers may comprise both traffic and control signals (e.g., paging signals/messages for incoming calls), which are used to establish and maintain communication with another party or destination. With a cellular communication module, the SNS unit 10 can communicate using one or more cellular communication protocols such as, for example, AMPS, ANSI-136, GSM, GPRS, EDGE, CDMA, wideband-CDMA, CDMA2000, and UMTS.

The memory 18 may be a general purpose memory that is used to store both program instructions for the processor 16 as well as data, such as audio data, video data, configuration data, and/or other data that may be accessed and/or used by the processor 16. The memory 18 may include a nonvolatile read/write memory, a read-only memory and/or a volatile read/write memory. In particular, the memory 18 may include a read-only memory in which basic operating system instructions are stored, a non-volatile read/write memory in which re-usable data, such as configuration information, directory information, and other information may be stored, as well as a volatile read/write memory, in which short-term instructions and/or temporary data may be stored.

As noted above, satellite signals are relatively weak, and generally cannot penetrate through walls. Thus, when the SNS unit 10 is inside a building, the SNS receiver 30 can lose track of one or more of the satellite navigation signals 15A-15D. The SNS receiver 30 may then begin a process of signal acquisition in an attempt to locate a sufficient number of satellite navigation signals 15A-15D to allow the SNS receiver 30 to determine its geographic location. However, when the SNS unit 10 is inside a building, these attempts will likely prove futile. Thus, the SNS unit 10 can consume significant amounts of power trying to re-acquire the satellite navigation signals 15A-15D. Thus, the SNS unit 10 can unnecessarily consume a large amount of battery life while inside a building. This may represent a particular problem for wireless telephones that include SNS receivers, as the user of the wireless telephone may experience unexpectedly short battery lifetimes if the wireless telephone is used inside buildings (which is, of course, often the case). Furthermore, while a wireless telephone including an SNS receiver can permit the user to manually turn the SNS receiver off, it can be troublesome for the user to have to do so whenever the device is taken inside a building, which can prompt some users to leave the SNS receiver turned off, which diminishes the utility of the device.

Some embodiments are based on a recognition that most buildings are wired with power lines that carry low frequency (50 to 60 Hz) alternating current (AC) power supply voltages of 110 V to 220 V to outlets throughout the building. According to some embodiments, a SNS unit 10 can be configured to detect the presence of a low-frequency AC power signal within the vicinity of the SNS unit 10. If a low-frequency AC power signal is detected, it can be inferred that the SNS unit 10 is near a building. If the low-frequency AC power signal is detected in conjunction with a significant decrease (or loss) in signal strength of one or more satellite navigation signals 15A-15D, it can be inferred that the SNS unit 10 is inside the building, and that the building is the cause of the lost signal strength. In response, the SNS unit 10 can disable the SNS receiver 30. In some embodiments, disabling the SNS receiver 30 includes turning the SNS receiver 30 off altogether and/or instructing the satellite navigation unit to stop trying to re-acquire the satellite navigation signals 15A-15D.

The SNS unit 10 can continue to monitor the low-frequency AC signal, and the SNS receiver 30 can be kept in a disabled state until the low-frequency AC signal is no longer detected. In some embodiments, the SNS unit 10 can "wake up" the SNS receiver 30 from time to time and attempt to re-acquire the satellite navigation signals 15A-15D notwithstanding the presence of the low-frequency AC signal.

Figure 3:
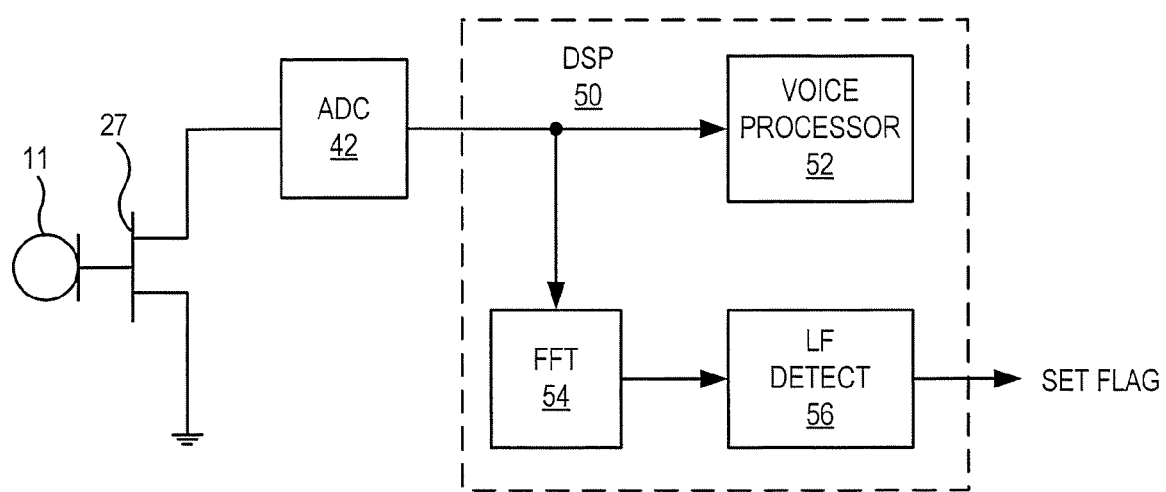
FIG. 3 is a block diagram of circuitry in an SNS unit according to some embodiments.

FIG. 3 is a block diagram of circuitry in an SNS unit 10 according to some embodiments that can be used to detect a low-frequency AC signal emitted by a power line. As shown therein, the SNS unit 10 includes a microphone 11 configured to convert acoustical signals into corresponding electrical signals. The microphone circuit 11 is reused to detect low frequency electromagnetic signals as described herein. The microphone includes a high-impedance input, represented by the transistor 27. The transistor 27 may also be any amplifier device. An output of the transistor 27 is coupled to an analog-to-digital converter (ADC) 42, which converts the analog signal output by the transistor 27 into a digital signal. The digital signal output by the ADC 42 is processed by a digital signal processor (DSP) 50. It will be appreciated that the ADC 42 and/or the DSP 50 can be implemented within the processor 16 and/or can be implemented as separate elements within the SNS unit 10. Furthermore, the functionality of the ADC 42 and/or the DSP 50 can be spread out over multiple chips within the SNS unit 10. The functionality can also be implemented in analog circuitry with a diplexer device separating the signal into the normal audio components and the low frequency signal which is then detected with an amplitude modulation detector.

In a typical wireless telephone, the digitized audio signal output by the ADC 42 is processed by a voice processor 52, which may analyze and encode a voice signal for transmission according to a cellular telephone protocol. Typically, low-frequency components of the audio signal (i.e. components below 300 Hz) are considered to be noise, and are filtered out of the signal as part of the voice processing. According to some embodiments, the audio signal output by the microphone 11 is analyzed to determine if it includes a low-frequency component that is normally associated with a power supply signal. Such signals can cause electromagnetic interference in the audio signal that results in a detectable signal peak of less than 100 Hz, for example, in the range of about 50 to about 60 Hz.

While embodiments of the invention are illustrated as detecting low frequency electromagnetic interference in an audio signal, the low frequency electromagnetic interference caused by a nearby power supply can in some embodiments be detected on a signal other than an audio signal detected by a microphone. For example, the electromagnetic interference could be detected on a dedicated circuit and antenna. However, it may be convenient to detect the low frequency electromagnetic interference on the audio signal, because the audio path may already include all circuitry, such as high gain, the ADC 42 and the DSP 50, needed to detect the signal.

In some embodiments the digitized signal output by the ADC 42 is may be processed using a Fast Fourier Transform (FFT) processor 54 which transforms the digitized time-domain audio signal into a frequency domain representation. It will be appreciated that the FFT 54 can be implemented within the processor 16 and/or the DSP 50 and/or can be implemented as separate elements within the SNS unit 10. A low frequency detection circuit 56 analyzes the frequency domain representation of the audio signal to determine if any frequency components are present in the range of 50 to 60 Hz. If so, a register flag is set in the processor 16 indicating the presence of a low-frequency signal.

Figure 4:
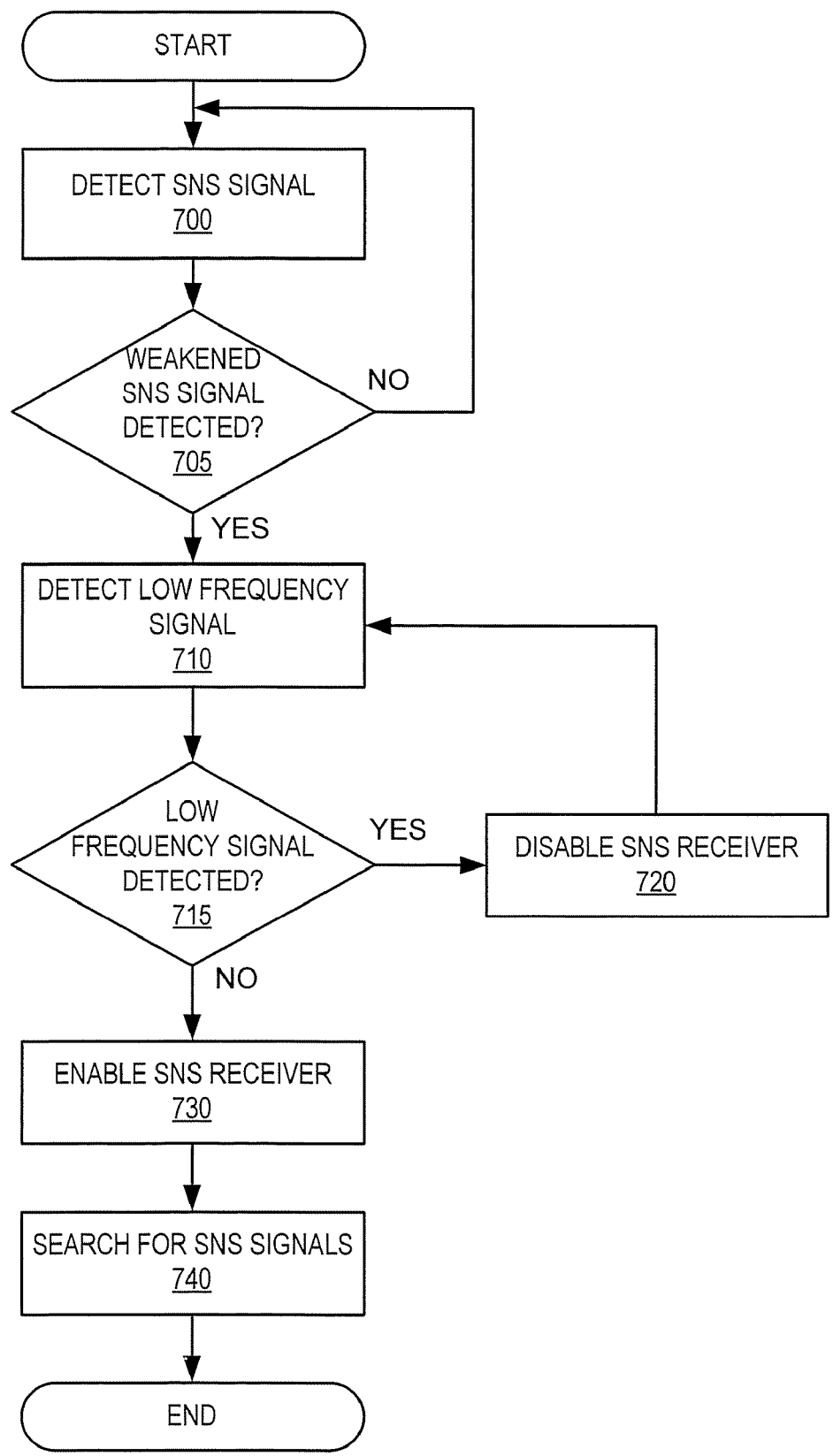
FIG. 4 is a flowchart illustrating operations of an SNS unit according to some embodiments.

FIG. 4 is a flowchart illustrating operations of an SNS unit 10 according to some embodiments. Referring to FIGS. 2-4, the operations may include detecting a satellite navigation signal (Block 700). While the satellite navigation signal remains strong, the SNS unit 10 continues to track the satellite navigation signal. In response to a detected weakening of the satellite navigation signal (Block 705), the operations include determining the presence or absence of a low frequency signal associated with power distribution lines (Block 710). The low frequency signal may have a frequency of about 50 Hz to about 60 Hz. The satellite navigation signal may include a plurality of satellite navigation signals from a plurality of SNS satellites, and weakening of the satellite navigation signal may include weakening of the plurality of satellite navigation signals.

The SNS unit 10 may include a microphone circuit 11 configured to generate an audio signal in response to detected sounds, and the presence or absence of a low frequency signal associated with power distribution lines may be determined by analyzing the audio signal received over the microphone. The audio signal may be analyzed using fast fourier transform processing in the processor 16 and/or the digital signal processor 50.

The SNS unit 10 may include a SNS receiver 30 that is configured to search for and process satellite navigation signals. If a low-frequency signal is detected, the SNS receiver 30 may be disabled (Block 720). Disabling the SNS receiver 30 may include at least one of (a) turning the SNS receiver 30 off, (b) configuring the SNS receiver 30 to cease searching for satellite navigation signals, and (c) decreasing a timeout value in the SNS receiver 30 associated with searching for satellite navigation signals. For example, the SNS receiver 30 can be configured to search for satellite navigation signals for a predetermined period of time (the timeout period) and, if enough satellite navigation signals are not found within that time frame, to enter into a sleep mode. The timeout period can be decreased in response to detecting the low-frequency signal, so that the SNS receiver 30 can enter sleep mode more quickly when a low-frequency signal associated with power distribution lines is nearby.

The operations then continue to monitor the low-frequency signal at Block 710. If the low frequency signal is no longer detected (or the signal is reduced), then the SNS receiver 30 can be enabled (Block 730), and the SNS receiver 30 can continue to search for satellite navigation signals (Block 740). In some embodiments, the SNS unit 10 can be configured to cause the SNS receiver 30 to periodically wake up and check for satellite navigation signals, even if the low frequency signal is still present.

Figure 5:
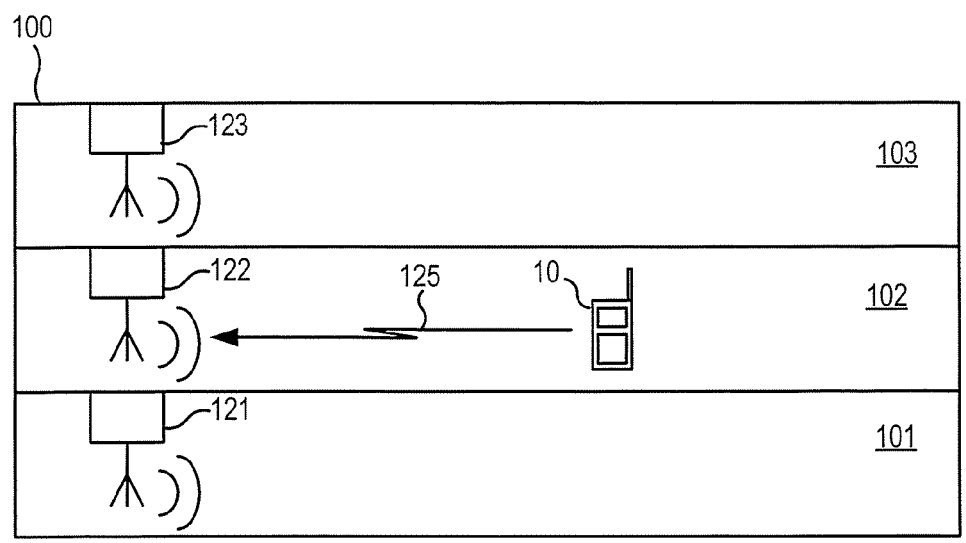
FIG. 5 illustrates an SNS unit according to some embodiments being used within a building.

In some embodiments, in response to determining that the SNS unit 10 has been taken into a building (e.g., by detecting the presence of a low frequency signal and losing the satellite navigation signals), the SNS unit 10 can attempt to establish a connection to a communication terminal within the building. For example, FIG. 5 illustrates an SNS unit 10 according to some embodiments being used within a building 100 that includes multiple floors 101, 102, 103.

As discussed above, when the SNS unit 10 is carried into the building, the SNS unit 10 may disable the SNS receiver 30 in response to detecting a loss (or significant decrease) of signal strength of one or more of the satellite navigation signals and in response to detecting the presence of low-frequency electromagnetic signals associated with power supply lines. In that case, the SNS unit 10 can also activate the short-range wireless communication module 32 and attempt to communicate with wireless devices 121-123 within the building 100 using a short range wireless communication link 125. As discussed above, the short range wireless communication module 32 may include a Bluetooth module, a wireless LAN (WLAN) module, etc.

The SNS unit 10 may obtain certain information from the wireless devices 121-123 within the building 100 via the wireless communication link 125. For example, the SNS unit 10 may obtain the street address and/or latitude/longitude of the building 10 and/or of the wireless devices 121-123 that transmitted the information. In some embodiments, the wireless devices 121-123 can use triangulation to determine an approximate location of the SNS unit 10 within the building. This information can be converted to latitude/longitude information and provided to the SNS receiver as an estimate of its precise location.

Accordingly, the location information can be provided to the SNS receiver 30. When the SNS receiver 30 is later enabled, the SNS receiver 30 can use such information to assist in re-acquiring and processing the satellite navigation signals. In some embodiments, wireless devices 121-123 can be placed at or near exits of the building, so that the SNS unit 10 can receive accurate location information just as the SNS unit 10 is being taken out of the building. This can further assist in SNS receiver 30 in re-acquiring the satellite navigation signals and re-starting satellite navigation.

The SNS unit may also obtain information about the wireless environment within the building 100, such as connection parameters (temporary key, connection cost, etc.) for a WiFi network within the building. The SNS unit 10 may also obtain elevation information for a particular floor and/or an indication of the floor that the SNS unit 10 is on. A wireless devices 121-123 can be placed, for example, in an elevator of the building 100 and can be configured to transmit the street address and floor number as it passes each floor. Thus, when the user exits the elevator at a given floor and moves out of range of the wireless device 121-123 within the elevator, the SNS unit 10 can retain the street address and floor in its memory even though the wireless device 121-123 in the elevator has moved on.

Furthermore, when the user exits the building 100, the SNS receiver 30 can be enabled in response to loss of the signal from the wireless devices 121-123. The wireless communication module 32 can then be deactivated to conserve battery life.

While in the building 100, a user of the SNS unit 10 may move around and/or change floors. As the SNS unit 10 comes into range of new devices 121-123, the SNS unit 10 can obtain additional location information Some embodiments of the present invention are described above with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A method of operating a portable electronic device including a satellite navigation system (SNS) receiver, comprising:
   determining the presence or absence of a low frequency signal associated with power distribution lines;

disabling the SNS receiver in response to detecting the low frequency signal associated with power distribution lines; and detecting weakening of a satellite navigation signal;

wherein determining the presence or absence of a low frequency electromagnetic signal associated with power distribution lines is performed in response to a detected weakening of the satellite navigation signal.

2. The method of claim 1, wherein the portable electronic device comprises a microphone circuit configured to generate an electrical signal in response to environmental sounds and/or in response to environmental electromagnetic fields, and wherein determining the presence or absence of a low frequency electromagnetic field associated with power distribution lines comprises analyzing the electrical signal received over the microphone.

3. The method of claim 2, wherein the portable electronic device further comprises a digital signal processor coupled to the microphone and configured to receive the audio signal, wherein analyzing the audio signal comprises analyzing the audio signal using fast fourier transform processing in the digital signal processor.

4. The method of claim 1, wherein the low frequency signal has a frequency of less than about 100 Hz.

5. The method of claim 1, wherein disabling the SNS receiver comprises at least one of (a) turning the SNS receiver off; (b) configuring the SNS receiver to cease searching for satellite navigation signals; and (c) decreasing a timeout value in the SNS receiver associated with searching for satellite navigation signals.

6. The method of claim 1, further comprising:
after disabling the SNS receiver, detecting a reduction of the low frequency signal associated with power distribution lines; and
enabling the SNS receiver in response to detecting the reduction of the low frequency signal associated with power distribution lines.

7. The method of claim 6, wherein detecting a reduction of the low frequency signal associated with power distribution lines comprises detecting an absence of the low frequency signal associated with power distribution lines.

8. The method of claim 6, wherein the satellite navigation signal comprises a plurality of satellite navigation signals from a plurality of SNS satellites, and wherein weakening of the satellite navigation signal comprises weakening of the plurality of satellite navigation signals.

9. A portable electronic device, comprising:
a satellite navigation system (SNS) receiver configured to determine a geographic location of the portable electronic device in response to satellite navigation signals; and
a processor configured to detect a low frequency signal associated with power distribution lines, and configured to disable the SNS receiver in response to detecting the low frequency signal associated with power distribution lines;
wherein the SNS receiver is configured to detect weakening of a satellite navigation signal, and wherein the processor is configured to detect the low frequency signal associated with power distribution lines in response to a detected weakening of the satellite navigation signal.

10. The portable electronic device of claim 9, further comprising a microphone configured to generate an audio signal in response to environmental sounds, and wherein the processor is configured to detect the low frequency signal associated with power distribution lines by analyzing the audio signal.

11. The portable electronic device of claim 10, further comprising a digital signal processor coupled to the microphone and configured to receive the audio signal, wherein the processor is configured to analyze the audio signal using fast fourier transform processing.

12. The portable electronic device of claim 9, wherein the processor is configured to disable the SNS receiver by at least one of (a) turning the SNS receiver off; (b) configuring the SNS receiver to cease searching for satellite navigation signals; and (c) decreasing a timeout value in the SNS receiver associated with searching for satellite navigation signals.

13. The portable electronic device of claim 9 wherein the processor is further configured to detect a reduction of the low frequency signal associated with power distribution lines after disabling the SNS receiver, and configured to enable the SNS receiver in response to detecting the reduction of the low frequency signal associated with power distribution lines.

14. The portable electronic device of claim 9, wherein the satellite navigation signal comprises a plurality of satellite navigation signals from a plurality of SNS satellites, and wherein weakening of the satellite navigation signal comprises weakening of the plurality of satellite navigation signals.

15. A method of operating a portable electronic device including a satellite navigation system (SNS) receiver configured to determine a geographic location of the portable electronic device in response to satellite navigation signals and a short-range wireless transceiver, the method comprising:
detecting weakening of the satellite navigation signals;
determining the presence or absence of a low frequency signal associated with power distribution lines in response to a detected weakening of the satellite navigation signals;
disabling the SNS receiver in response to detecting weakening of the satellite navigation signal and detecting the low frequency signal associated with power distribution lines; and
activating the short-range wireless transceiver in response to detecting weakening of the satellite navigation signal and detecting the low frequency signal associated with power distribution lines.

16. The method of Claim 15, further comprising:
detecting a loss of signal associated with the short-range wireless communication channel; and
enabling the SNS receiver in response to the loss of signal associated with the short-range wireless communication channel.

17. The method of claim 15, further comprising:
receiving position information regarding a current position of the portable electronic device over the short-range wireless communication channel.

18. The method of claim 17, further comprising:
providing the position information obtained over the short-range wireless communication channel to the SNS receiver.

* * * * *